United States Patent [19]

Kim

[11] Patent Number: 4,756,335
[45] Date of Patent: Jul. 12, 1988

[54] BALL DUMP VALVE
[75] Inventor: Young S. Kim, Canton, Mich.
[73] Assignee: General Motors Corporation, Detroit, Mich.
[21] Appl. No.: 55,837
[22] Filed: Jun. 1, 1987
[51] Int. Cl.[4] .................................... F16K 15/04
[52] U.S. Cl. .................. 137/519.5; 137/533.11
[58] Field of Search .................. 137/519.5, 533.11

[56] References Cited
U.S. PATENT DOCUMENTS

| | | | |
|---|---|---|---|
| 1,381,463 | 6/1921 | Hotchkiss | 137/519.5 |
| 2,717,000 | 9/1955 | Wilson | 137/519.5 X |
| 3,290,000 | 12/1966 | Snyder | 137/533.11 X |
| 3,468,819 | 9/1969 | Giger | 137/519.5 X |

Primary Examiner—Robert G. Nilson
Attorney, Agent, or Firm—Donald F. Scherer

[57] ABSTRACT

A ball dump valve for a rotary clutch assembly has a valve housing with a shoulder which abuts a wall surface on the housing of the clutch assembly. A displaceable component or finger is swaged to abut another wall on the clutch assembly housing to thereby securely fasten the valve housing in the clutch assembly. The interior of the valve housing has a chamber in which is disposed a ball. The chamber has a frusto-conical surface with an opening therein. The ball is seated by pressure against the frusto-conical surface to close the valve and is urged along the frusto-conical surface by centrifugal force to open the valve.

3 Claims, 1 Drawing Sheet

BALL DUMP VALVE

BACKGROUND OF THE INVENTION

This invention relates to ball dump check valves and more particularly to such ball dump valves such as those utilized in rotary fluid-operated clutches.

Prior art centrifugal ball dump valves generally have a valve housing which is sized to be securely press fit in a clutch housing or pressure plate. During assembly, the valve housing can be distorted and thereby affect the operation of the valve. While the distortion does not prevent valve operation, it does make it difficult to predict with accuracy the rotary speed at which the ball valve will open. Also, with the use of sheet metal components in the clutch housing and piston assembly, it is desirable to provide a more secure fastening structure to maintain the ball valve assembly in the clutch assembly.

SUMMARY OF THE INVENTION

The present invention overcomes the drawbacks of the prior art by providing a valve housing with a locating shoulder which abuts a wall of the clutch assembly. The shoulder positions the valve housing in the clutch assembly. A plurality of displaceable components or fingers on the valve housing are swaged to abut another all of the axial clutch assembly which is spaced from the shoulder abutting wall. The valve housing is thus securely fastened in the clutch assembly without distorting or otherwise significantly stressing the valve housing in a manner which would affect valve operation.

It is therefore an object of this invention to provide an improved ball dump valve assembly which is positioned in a clutch assembly by a wall abutting a wall member and secured in the assembly by swaging a cylindrical portion of the ball valve housing into abutment with an opposite wall member on the clutch assembly.

It is another object of this invention to provide an improved ball dump valve for a clutch assembly which has a clutch housing with spaced walls and wherein the ball dump valve also has a housing with a locating shoulder which abuts one wall of the clutch housing and displaceable member which is displaced into abutment with the other wall of the clutch housing and further wherein the ball dump valve has an inner chamber enclosing a ball member which inner chamber includes a valve seat cooperating with the ball member and also wherein the inner chamber and valve seat are not distorted in a manner to affect valve operation during assembly or during displacement of the displaceable member.

These and other objects and advantages of the present invention will be more apparent from the following description and drawings.

DESCRIPTION OF THE EMBODIMENTS

Figure 1:
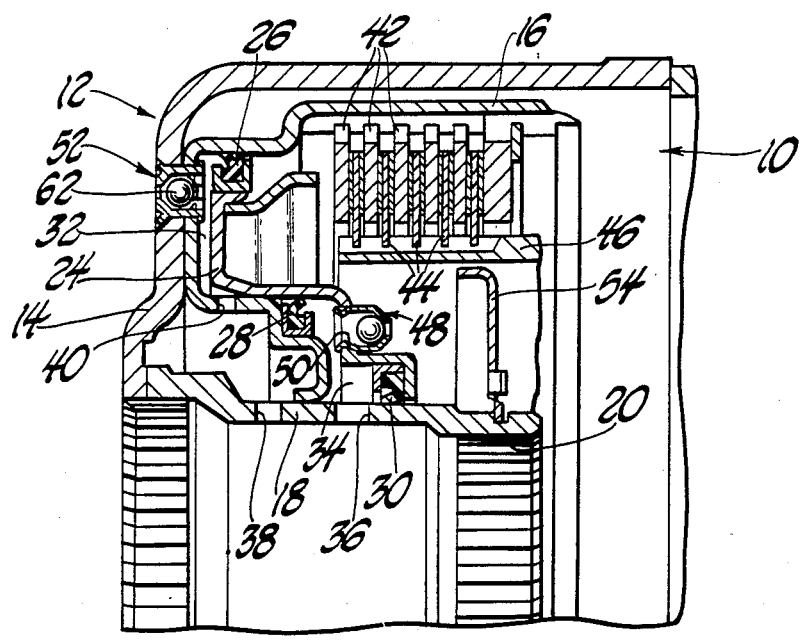
FIG. 1 is a cross-sectional view of a clutch assembly including a ball dump valve constructed in accordance with this invention.

FIG. 1 depicts a clutch assembly 10 having a housing assembly, generally designated 12. The housing assembly 12 has an outer shell or clutch housing member 14 and an inner piston housing or clutch hub 16. These two members 14 and 16 are joined together by welding or other bonding process. Also secured to the members 14 and 16 is an input hub 18 which has one or more drive spline portions 20 to permit a drive connection with a transmission input shaft, not shown.

A sheet metal piston 24 is slidably disposed in the piston housing 16 and also on the hub 18. Three annular lip seals 26, 28 and 30 cooperate with the piston housing 16, piston 24 and hub 18 as shown to provide a pair of annular apply chambers 32 and 34. Fluid pressure is applied, in a well-known manner, to chamber 34 through a passage 36 and to chamber 32 through a pair of passages 38 and 40.

The hub 16 has splined thereto a plurality of clutch plates 42. Interleaved with the clutch plates 42 are a plurality of clutch plates 44 which are splined to a hub 46. The hub 46 is drivingly connected with a transmission component such as a sun gear, not shown.

The piston 24 is moved axially by fluid pressure in either or both of chambers 32 and/or 34 to cause frictional engagement between clutch plates 42 and 44 and thereby provide a drive connection between the input hub 18 and the hub 46. The chamber 34 is in fluid communication with a ball dump valve 48 which is constructed in accordance with the prior art ball valves. This ball valve is press fit for a predetermined depth, into an opening 50 formed in the piston 24. The apply chamber 32 is in fluid communication with a ball dump valve 52 which is constructed in accordance with the present invention and is shown more clearly in FIG. 3.

The piston 24 is urged to the disengaged position shown by a plurality of conventional return springs, not shown, which are disposed between the clutch piston 24 and a retainer plate 54 which is secured to the hub 18. The operation of the clutch assembly 10 is well-known. It is also well-known that when the clutch is disengaged, the chambers 32 and 34 may contain residual fluid.

Due to the high rotating speeds of the clutch, it is possible for the residual fluid to develop a centrifugal pressure head which could inadvertently cause engagement of the clutch assembly 10. To prevent this unintended engagement, ball dump valves, such as 48 and 52, are provided.

As is well-known with ball dump valves, these assemblies will open to permit exhaust or fluid when the rotary speed of the clutch reaches a predetermined value. The ball dump valve 48, due to the press fit with the piston 24, can be distorted and thereby affect the rotary speed at which valve opening will occur. The ball dump valve 52 does not have this disadvantage.

Figure 2:
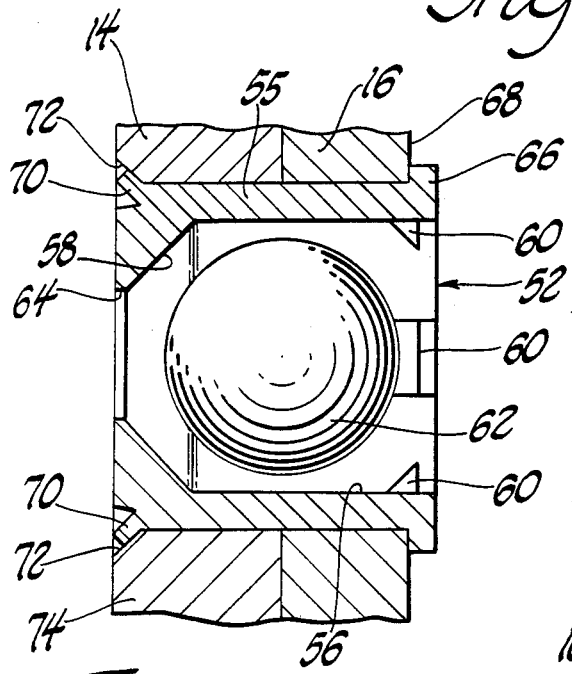
FIG. 2 is an enlarged view of the preferred embodiment of this invention.

As seen in FIG. 2, the ball dump valve 52 has a housing 55 in which is formed a cylindrical chamber 56. The cylindrical chamber 56 has a frusto-conical surface 58 formed integral with the left end thereof and a plurality of ball retaining fingers 60 formed substantially adjacent the righthand end of chamber 56.

The terms right and left are meant to assist one when viewing the drawings. These terms are not intended to limit one in the practice of this invention.

A ball or sphere 62 is disposed within the chamber 56. Fluid pressure in the clutch apply chamber 32 will cause the ball 62 to seat on the frusto-conical surface 58 thereby closing the discharge opening 64 so that sufficient pressure can be generated within the clutch apply chamber to enforce clutch engagement.

When the clutch apply pressure is removed from the chamber 32, the only pressure attempting to seat the ball 62 will be centrifugally generated pressure. The mass of the ball 62 and the ramp angle 58 are designed such that the ball will move radially outward relative to the clutch housing along the frusto-conical surface 58 at a predetermined clutch speed to exhaust residual fluid from the apply chamber, thus preventing inadvertent clutch apply.

The housing 55 has a shoulder portion 66 which abuts a surface 68 formed on the piston housing 16. Also formed on the housing 55 is a swageable member 70. The member 70 is a cylindrical shape formed on the entire outer cylindrical surface of housing 55. The swageable member 70 is swaged outwardly against a conical surface 72 formed in a wall 74 of the housing 14. As can be seen in FIG. 2, the swaging of the member 70 prevents the rightward movement of the housing 54 while the shoulder 66 prevents leftward movement of the housing 55. To ensure that leakage does not occur around the outer surface of the housing 55, a line-to-line or light press fit can be utilized between either or both housings 14 and 16 and the housing 55.

Since press fitting does not have to be sufficient to maintain the assembly of the ball dump valve within the housing, there is no distortion of the cylindrical or frusto-conical portions of the interior of the housing 55. The sphere 62 is prevented from escaping the housing 55 at the right side thereof by the ball retaining fingers 60.

Figure 3:
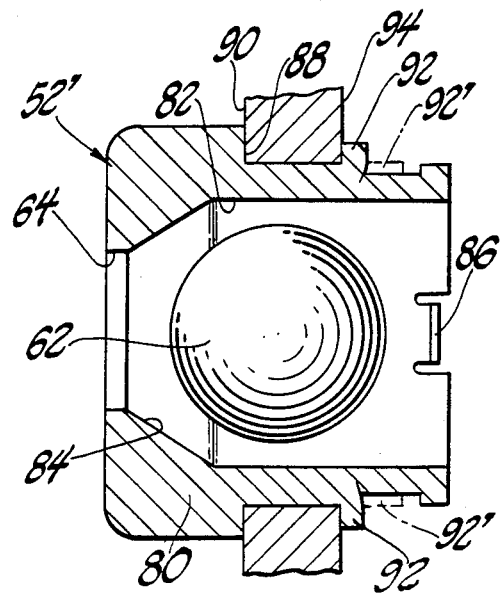
FIG. 3 is an alternate embodiment of this invention.

The embodiment of ball valve 52' is shown in FIG. 3. This embodiment has a housing 80 having a cylindrical chamber 82 with a frusto-conical valve seat 84 formed therein. A plurality of ball retaining fingers 86 prevent the sphere 62 from escaping chamber 82 at the right side thereof. The housing 80 includes a shoulder 88 which abuts a surface or wall 90 and a displaceable member or finger 92 which is displaced into abutment with an opposite facing wall 94. A portion of the displaceable member 92 is shown in phantom at its predisplaced location.

Figure 4:
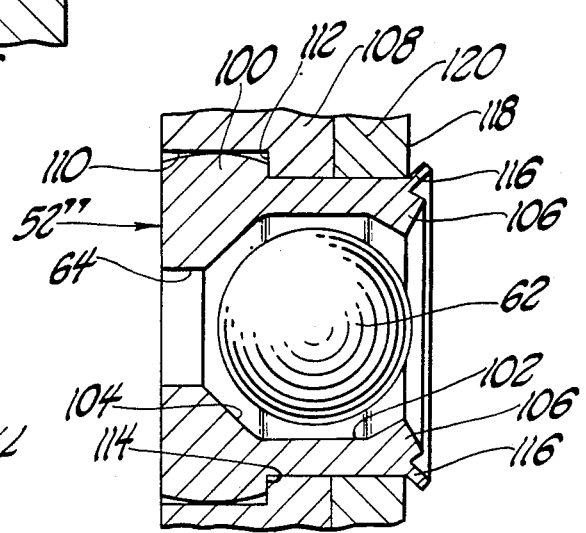
FIG. 4 is another alternate embodiment of this invention.

A further embodiment of the ball dump valve is shown at 52" in FIG. 4. In this embodiment, a valve housing 100 has a cylindrical chamber 102 with a frusto-conical seat 104 and a plurality of ball retaining fingers 106. The ball retaining fingers 106 are displaced inwardly after the ball 62 has been positioned in the cylindrical chamber 102.

The valve assembly 52" is adapted to be disposed in a clutch housing assembly wherein one of the housing components, designated 108, has a stepped recess 110 formed therein, which recess 110 has a shoulder 112. The housing 100 has a shoulder 114 which is urged into abutment with the should 112 and maintained in abutment by a displaceable member 116 which is swaged or otherwise displaced outwardly into abutment with a wall 118 formed on a clutch housing component 120.

In both of the embodiments shown in FIGS. 3 and 4, the swaged or displaced material provides part of the retention mechanism for securing the ball valve assembly within the clutch housing assembly against the force of apply pressure. In the embodiment of FIG. 2, the shoulder 66 is the retaining portion of the ball dump valve assembly which prevents fluid pressure from disengaging the valve assembly from the housing. Therefore, in FIGS. 3 and 4, it is necessary to ensure that sufficient material is swaged against the clutch housing to ensure that inadvertent removal of the valve assembly will not occur due to the high clutch engagement pressure.

In each of the valve assemblies, the shoulder portion provides the primary locating surface for the valve assembly while the swaged portion secures the valve assembly in the clutch housing assembly. As previously mentioned, a light press fit will generally be used to prevent leakage of fluid between the outer surface of the valve assembly. In the alternative, it is possible to apply a gasket material or other sealant to the outer surface of the valve assembly prior to insertion within the clutch housing, in which case, a press fit would not be necessary to control fluid leakage.

The housings 55, 80 and 100 are preferably cold formed to maintain the desired internal dimensions. Because heavier stock material is used in cold forming, the angle of the frusto-conical surfaces will be more precise and better protected during handling prior to assembly in the clutch. The housing is not subject to collapse thus reducing leakage at the outer diameter. The 360 degree swaging operation will ensure that the housing remain installed even with the thermal cycling that occurs during transmission operation.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A ball check valve assembly for a clutch assembly comprising: a rotatable housing means with inner and outer radially extending wall surfaces; and a ball check assembly comprising a housing having shoulder means for abutting one of said wall surfaces, swageable means displaced against the other of said wall surfaces for securing said housing in said clutch assembly, an inner chamber formed between said shoulder means and said swageable means having a frusto-conical surface with an opening and an opposite facing substantially cylindrical opening, a portion of said inner chamber adjacent said shoulder being surrounded by said rotatable housing, and a plurality of radially inwardly extending fingers disposed in said cylindrical opening; and a spherical member disposed in said chamber having a diameter greater than the smallest opening of said frusto-conical opening and less than said cylindrical opening, said fingers extending into said chamber sufficiently to prevent said sphere from escaping said chamber.

2. A ball check valve assembly for a clutch assembly comprising: a rotatable housing means with inner and outer radially extending wall surfaces; a ball check assembly including a cold formed housing having shoulder means for abutting one of said wall surfaces and cylindrical outer surface, swageable means formed on the outer surface and being displaced against the other of said wall surfaces for the entire extend of the outer surface for securing said housing in said clutch assembly, an inner chamber disposed between said shoulder means and said swageable means having a frusto-conical surface with an opening and an opposite facing substantially cylindrical opening, and a plurality of radially inwardly extending fingers disposed in said cylindrical opening; and a spherical member disposed in said chamber having diameter greater than the smallest opening of said frusto-conical opening and less than said cylindrical opening, said fingers extending into said chamber sufficeintly to prevent said sphere from escaping said chamber.

3. A ball check valve assembly for a clutch assembly comprising: a rotatable wall means with inner and outer radially extending wall surfaces; a ball check assembly housing extending through said rotatable wall means and having shoulder means for abutting the inner of said wall surfaces, cylindrical swageable means displaced against the outer of said wall surfaces for securing said housing in said clutch assembly, an inner chamber formed substantially between said shoulder means and said swageable means having a frusto-conial surface with an opening and an opposite facing substantially cylindrical opening, and a plurality of radially inwardly extending fingers disposed in said cylindrical opening; and a spherical member disposed in said chamber having a diameter greater than the smallest opening of said frusto-conial opening and less than said cylindrical opening, said fingers extending into said chamber sufficiently to prevent said sphere from escaping said chamber.

* * * * *